Patented Apr. 21, 1942

2,280,098

UNITED STATES PATENT OFFICE 2,280,098

SYNTHETIC MATERIAL

William Henry Moss, London, England, assignor to Celanese Corporation of America, a corporation of Delaware No Drawing. Application August 18, 1938, Serial No. 225,570. In Great Britain September 14, 1937

9 Claims. (Cl. 2—14)

This invention relates to synthetic materials such as sheets, films, foils, coatings and the like having a basis of cellulose acetate or other organic derivative of cellulose, to compositions suitable for the production of such materials, to articles embodying such materials and to cellulose derivatives suitable for use in the production of such compositions, materials and articles.

Materials of the kind referred to above when exposed to a moist atmosphere in general become fogged in the same way as glass does when so exposed. This is a disadvantage particularly when the materials in question are used for such purposes as the manufacture of eye pieces in respirators or goggles or of windows, e. g. in aircraft. I have now found that by acetylating cellulose and hydrolysing the resulting primary acetate to a point considerably beyond the inception of acetone solubility, a cellulose acetate can be obtained which although insoluble and resistant to liquid water is nevertheless soluble in acetone diluted to a considerable extent with water and that from such a cellulose acetate, films, foils, sheets, coatings and like material can be made which are substantially free from the disadvantage referred to above, particularly when the materials contain in addition to the cellulose acetate of special solubility properties a modifier (e. g. a plasticiser or synthetic resin) having an affinity for water. I have further found that by similar methods, materials having the desired properties can be made with a basis of other organic derivatives, particularly organic esters of cellulose.

The sheet materials of the present invention have a basis of an organic derivative of cellulose which is insoluble in water but is soluble in a liquid mixture containing a neutral organic liquid and at least an equal amount of water. Preferably, the materials contain in addition a modifier for the cellulose derivative, having an affinity for water, i. e. a substance, for example, a plasticiser or synthetic resin, which modifies the physical properties of the sheet material and which has an affinity for water. Among modifiers which are plasticizers for organic derivatives of cellulose, mention may be made of diacetin, triacetin, diglycerine acetate, dimethyl phthalate and "Softener 90." Other plasticisers may be present, for example, diethyl phthalate, dimethyl, diethyl and dibutyl tartrates, methyl glycol phthalate and trichlorbutyl phosphate. Among modifiers which are synthetic resins special mention may be made of those obtainable by condensing an alcohol containing at least two hydroxy groups with a hydroxy polycarboxylic acid, a formal of such an acid or a fatty acid ester of such an acid. Such resins are described in British Patent No. 453,833, and include condensation products of citric acid, methylene citric acid, acetyl citric acid and tartaric acid with glycerol, formal glycerol and glycol. The synthetic resins of this kind which are soluble in water or in aqueous acetone are particularly suitable.

The invention includes articles, for example, respirator face-pieces, aircraft and land vehicles having an enclosed space provided with a window and such that when in use said window is liable to be exposed on one side to a moist warm atmosphere and on the other side to a colder atmosphere, said window having a transparent closure comprising a sheet at least one surface of which is composed largely of an organic derivative of cellulose having the solubility properties referred to above. The sheet may be composed largely of the special organic derivative of cellulose throughout; or a composite sheet may be employed, for example, one formed by sticking a sheet composed largely of the special organic derivative of cellulose to a sheet of glass or other water impermeable material, the composite sheet being so positioned that the surface containing the organic derivative of cellulose is the surface liable to be exposed to the moist warm atmosphere in the use of the article. Thus, for example, in a respirator face-piece, the eye-piece or eye-pieces may be composed of sheets of glass stuck to sheets of the material containing the special organic derivative of cellulose and arranged so that the said material is on the inside of the face-piece. An alternative and in most cases preferable arrangement is to separate the sheets of glass or other impermeable material and of the cellulose derivative material by an airspace, the sheet of cellulose derivative material again being on the inside of the face-piece. From the point of view of resistance to dimming over a long period, however, a simple sheet of the cellulose derivative material for closing the window aperture is the most satisfactory arrangement. Similar arrangements to those described for respirator eye-pieces can be adopted in providing windows or windscreens for closed compartments in land vehicles and aircraft.

Composite sheet materials may also be made by sticking the sheet material containing the special organic derivative of cellulose to water permeable material such as gelatin or coating the cellulose derivative sheet material with a composition having a basis of such water permeable material. The sheet materials of the invention can also be used for surfacing wood, paper or other opaque materials although their principal utility is in making transparent window closures. The invention includes the production of the special cellulose derivatives having the solubility properties specified above and also the derivatives themselves and compositions of matter containing these derivatives. The cellulose derivatives of the invention are preferably organic esters of cellulose. They may be made by ripening an organic ester of cellulose in solution until the desired solubility properties are obtained. The attainment of these properties by ripening is expedited either by pretreating the cellulose from which the ester is to be made, e. g. with formic acid or acetic acid in admixture with a small proportion of hydrochloric or sulphuric acid, under such conditions as to break down to some extent the cellulose chains; or by conducting esterification of the cellulose under more vigorous conditions than is usual, for example, in the presence of a relatively high amount, e. g. 10–20% of sulphuric acid or like acting esterification catalyst and/or by allowing the temperature to rise considerably during esterification.

The organic derivative of cellulose is preferably a cellulose acetate which is soluble in a liquid mixture containing acetone and at least an equal amount of water. The cellulose acetate may be soluble in even more dilute solutions of acetone, for example, solutions containing acetone and water in the proportions of 40 or 45 to 60 or 55. Instead of celullose acetate, other organic esters of cellulose may be employed, for example, cellulose propionate or butyrate. The invention moreover includes the production and use of cellulose ethers having the desired solubility properties, for example, methyl, ethyl and oxyethyl cellulose. In the production of such ethers the desired solubility properties can readily be obtained by controlling the degree of maturing of the alkali cellulose before etherification.

The compositions of the invention contain the special cellulose derivatives in solution in a liquid mixture containing a volatile neutral organic solvent, at least 30% of water, a medium or high boiling solvent and/or a modifier having an affinity for water. Among medium or high boiling solvents of particular value with the cellulose acetates of the invention, mention may be made of ethyl lactate, the monomethyl ether of ethylene glycol, diacetone alcohol, cyclohexanone, methyl cyclohexanone and ethyl iso-oxybutyrate. The compositions may contain any of the modifiers having an affinity for water referred to above in connection with the composition of the sheet materials. The presence of the medium or high boiling solvent facilitates the production of sheets, films, coatings and the like by evaporation of the compositions without "blushing." The presence of the modifier having an affinity for water, and particularly a modifier which is a synthetic resin of the class referred to above, increases the resistance of the sheets, films and other materials made from the compositions to dimming in the presence of a moist atmosphere. Amor t suitable volatile neutral organic solvents for us; in the compositions of the invention are acetone, dioxane, methyl ethyl ketone and methylene ethylene ether.

The amount of water in the solvent mixtures of the compositions should be at least 30% and may be considerably higher, e. g. 40–45–50% or even higher. At least a proportion of the acetone or other volatile solvent in the solvent mixture can be replaced by alcohol, so cheapening the process which is already considerably cheaper than ordinary processes for the manufacture of films and like materials from cellulose acetate involving the use of substantially anhydrous acetone as the solvent. I have found for example, that with the special cellulose acetates of the invention excellent results are obtainable using such solvent mixtures as 25% acetone; 25% alcohol; 50% water, or 10% acetone; 60% alcohol; 30% water, a small addition, for example, 4–5 or 6% of ethyl lactate, diacetone alcohol or like medium or high boiling solvent being made in each case.

Apart from the special synthetic resins having an affinity for water referred to above other synthetic resins may also be present in the compositions of the invention. Among such resins, mention may be made of the diphenylol-propane-acetone and diphenylol-propane-formaldehyde resins and also of the formaldehyde-toluene-sulphonamide resins. Such resins are not in general soluble in mixtures containing a large proportion of water for example 50% aqueous acetone. When they are employed, therefore, the solvent mixture should either contain a lower proportion of water and a higher proportion of organic liquids such as alcohol or should be such that on evaporation of the volatile constituents, the mixture of less volatile constituents remaining is capable of dissolving the resins. When such a solvent mixture is used the resins may be initially applied in dispersed form so that on evaporation of the volatile solvent they dissolve.

Sheet materials of the kind referred to above can be made by flowing the compositions of the invention on to suitable surfaces and evaporating the solvent and from such materials eye-pieces for respirators or other window closures can be cut or stamped.

As indicated above one of the most important applications of the invention is in the production of transparent sheet material suitable for the production of respirator eye-pieces or for similar applications where the maintenance of transparency in a moist atmosphere is required. The esters of the invention and compositions containing them have, however, many other applications. Thus, apart from the manufacture of transparent films, foils and sheets such compositions can be used for coating wood, paper, fabrics or other materials. The cheapness of the solvent mixture is an important advantage of such applications. The compositions and also foils made therefrom can be used as adhesives, for example, in sticking ordinary cellulose acetate material to wood, paper or other materials, particularly cellulosic materials. The invention also includes the production of composite transparent materials made by surfacing a sheet or film of ordinary cellulose acetate or other ester of cellulose with a foil of the special organic derivative of cellulose of the invention with a view to protecting the coated surface against fogging in a damp atmosphere.

The following examples illustrate the invention.

Example 1

A film-forming solution of the following constitution is made up as follows:

| | Parts |
|---|---|
| Special cellulose acetate | 20 |
| Water | 100 |
| Acetone | 40 |
| Methyl cellosolve | 50 | the parts being by weight. The special cellulose acetate is a cellulose acetate having a maximum solubility in a 50% aqueous solution of acetone.

The composition is flowed on to a suitable film-forming surface to produce a film about 0.010″ thick. Discs of suitable size are stamped from this film for the production of respirator eyepieces. Other compositions that can be used in the same way are:

Example 2

| | Parts |
|---|---|
| Special cellulose acetate | 20 |
| Triacetin | 2 |
| Water | 68 |
| Acetone | 80 |
| Diacetone alcohol | 30 |

Example 3

| | Parts |
|---|---|
| Special cellulose acetate | 20 |
| Triacetin | 2 |
| Acetone | 12 |
| Ethyl alcohol | 28 |
| Water | 50 |
| Diacetone alcohol | 5 |

Example 4

| | Parts |
|---|---|
| Special cellulose acetate | 20 |
| Diglycerine acetate ("Glyacon") | 8 |
| Acetone | 12 |
| Alcohol | 28 |
| Water | 50 |
| Diacetone alcohol | 5 |

Example 5

| | Parts |
|---|---|
| Special cellulose acetate | 30 |
| Dimethyl phthalate | 6 |
| Water | 100 |
| Dioxane | 100 |
| Ethyl lactate | 15 |

The dimethyl phthalate can be replaced by "Softener 90" or "Glyacon" (diglycerine acetate).

Example 6

The process is carried out as in Example 1, except that the film-forming solution is composed of 20 parts of cellulose acetate having its maximum solubility in 40% aqueous acetone, 10 parts of methylene citric acid-glycerol resin, 50 parts dioxane and 50 parts water. The methylene citric acid-glycerol resin is made by heating 20.4 parts of methylene citric acid with 6 parts of glycerol in an open vessel at 180° C. until a test sample gels when heated for 10 minutes at 185–190° C. in a glass tube in an oil-bath as described in British Patent No. 453,833. Instead of using methylene citric acid and glycerol, condensation may be effected in a similar way between citric acid glycerol and paraformaldehyde.

Example 7

The process is carried out as in Example 6 except that the film-forming solution contains a citric acid glycerol resin instead of the methylene citric acid-glycerol resin.

The citric acid-glycerol resin is made by condensing 20 parts of citric acid and 9.2 parts of glycerol in the same way as is described in Example 6 for the production of the methylene citric acid-glycerol resin. In place of glycerol, glycol or formal glycerol may be employed and in place of citric acid, acetyl citric acid or tartaric acid, the proportions being substantially equimolecular.

Example 8

The process is carried out as in Example 6 except that the film-forming solution has the following composition:

| | Parts |
|---|---|
| Special cellulose acetate | 20 |
| Methylene citric acid-glycerol resin | 10 |
| Dioxane | 50 |
| Water | 50 |
| Glycerine | 1 |
| Diethylene glycol | 3 |

The film-forming solutions of the preceding Examples 1–3 are also very suitable used as adhesives for sticking ordinary cellulose acetate sheet to itself or to other materials, for instance, paper or cardboard or for sticking sheets of the special cellulose acetate to such materials.

The solutions described in Examples 6–8 are suitable for making films and foils of thickness ranging from 0.001″–0.030″ or even higher.

Solutions suitable for the formation of films or coatings by spraying can be obtained by diluting any of the solutions referred to above with more solvent. The following is an example of such a diluted solution based on Example 6 above.

Example 9

| | Parts |
|---|---|
| Cellulose acetate | 20 |
| Methylene citric acid glycerol-resin | 10 |
| Water | 100 |
| Dioxane | 100 |

The following examples illustrate the production of cellulose acetates according to the invention:

Example 10

100 parts of cellulose are pretreated for 12 hours at 30–40° C. with 100 parts of acetic acid. The mass is then added to a mixture, precooled to about 10° C., of 300 parts of acetic acid, 300 parts of acetic anhydride and 15 parts of sulphuric acid. Acetylation is allowed to continue until all the cellulose has dissolved, the temperature not being allowed to rise above about 20° C. 40–50 parts of water are then added and ripening is effected by allowing the mixture to stand at a temperature of 25–30° C. until a sample removed is soluble in a 40% aqueous solution of acetone. Premature precipitation during ripening is avoided by the addition of further quantities of water from time to time. The cellulose acetate is then precipitated by the addition of acetone, filtered, washed in acetone and dried.

Example 11

The process is carried out as in Example 10, except that during acetylation, the temperature is allowed to rise to 60–65° C. and the mixture is maintained at that temperature until a sample of the acetate is soluble in 80% aqueous acetone. Ripening is then effected as described in Example 10, except that a much shorter period of ripening is required to obtain the desired solubility properties.

Example 12

100 parts of cellulose are pretreated with 500–700 parts of acetic acid and 2–10 parts of hydrochloric acid at a temperature of 50–60° C. for 3–15 hours according to the proportion of hydrochloric acid present. The mixture is then cooled to about 10° C., 300 parts of acetic anhydride are added and acetylation and ripening are carried out as described in Example 10, except that a much shorter period of ripening will be found necessary to obtain the desired solubility properties.

In Examples 10-12 at least a part of the sulphuric acid used as the acetylation catalyst can be replaced by phosphoric acid.

In a similar way, other esters of cellulose having the desired solubility properties can be made, for example, cellulose propionate or butyrate.

Having described my invention, what I desire to secure by Letters Patent is:

1. An article having a window, and such that when in use said window is liable to be exposed on one side to a moist warm atmosphere and on the other side to a colder atmosphere, said window having a transparent closure comprising a sheet at least one surface of which is composed largely of an organic derivative of cellulose which is insoluble in water but soluble in a liquid mixture containing a neutral organic liquid and at least the same amount of water.

2. A respirator face-piece having at least one eye-piece closed by a transparent sheet at least one surface of which is composed largely of an organic derivative of cellulose which is insoluble in water but soluble in a liquid mixture containing a neutral organic liquid and at least the same amount of water.

3. An article having a window, and such that when in use said window is liable to be exposed on one side to a moist warm atmosphere and on the other side to a colder atmosphere, said window having a transparent closure comprising a sheet at least one surface of which is composed largely of cellulose acetate which is insoluble in water but soluble in a liquid mixture containing acetone and at least the same amount of water.

4. A respirator face-piece having at least one eye-piece closed by a transparent closure comprising a sheet having a basis of an organic derivative of cellulose which is insoluble in water but soluble in a liquid mixture containing a neutral organic liquid and at least the same amount of water, said sheet being stuck to a sheet of water-impermeable material and the resulting composite sheet being so positioned that the surface containing the organic derivative of cellulose is on the inside of the face-piece.

5. A respirator face-piece having at least one eye-piece closed by a transparent closure which comprises a sheet having a basis of an organic derivative of cellulose which is insoluble in water but soluble in a liquid mixture containing a neutral organic liquid and at least an equal amount of water, said sheet being separated by an air-space from a sheet of water-impermeable material and being so positioned that one of its surfaces is on the inside of the face-piece.

6. A respirator face-piece having at least one eye-piece closed by a transparent closure which comprises a sheet of material having a basis of an organic ester of cellulose which is insoluble in water but soluble in a liquid mixture containing a neutral organic liquid and at least the same amount of water, said ester of cellulose being in intimate admixture with a plasticizer having an affinity for water.

7. A respirator face-piece having at least one eye-piece closed by a transparent closure which comprises a sheet of material having a basis of an organic ester of cellulose which is insoluble in water but soluble in a liquid mixture containing a neutral organic liquid and at least the same amount of water, said ester of cellulose being in intimate admixture with a synthetic resin having an affinity for water.

8. A respirator face-piece having at least one eye-piece closed by a transparent closure which comprises a sheet of material having a basis of an organic ester of cellulose which is insoluble in water but soluble in a liquid mixture containing a neutral organic liquid and at least the same amount of water, said ester of cellulose being in intimate admixture with a plasticizer having an affinity for water together with a synthetic resin having such an affinity.

9. A respirator face-piece having at least one eye-piece closed by a transparent closure which comprises a sheet of material having a basis of cellulose acetate which is insoluble in water but soluble in a liquid mixture containing acetone and at least the same amount of water, said cellulose acetate being in intimate admixture with a plasticizer having an affinity for water and with a synthetic resin having such an affinity, said synthetic resin being a condensation product of an alcohol containing at least two hydroxy groups with a substance selected from the class consisting of hydroxy polycarboxylic acids, formals of such acids and fatty acid esters of such acids.

WILLIAM HENRY MOSS.